United States Patent
Decuir et al.

(10) Patent No.: US 8,588,979 B2
(45) Date of Patent: Nov. 19, 2013

(54) ENHANCEMENTS TO MECHANICAL ROBOT

(75) Inventors: John David Decuir, San Diego, CA (US); Todd Gen Kozuki, San Diego, CA (US); Otis James Gates, San Diego, CA (US); Satoshi Orii, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2191 days.

(21) Appl. No.: 11/058,453

(22) Filed: Feb. 15, 2005

(65) Prior Publication Data

US 2006/0184277 A1   Aug. 17, 2006

(51) Int. Cl.
*G05B 15/00* (2006.01)

(52) U.S. Cl.
USPC ............ 700/259; 382/115; 382/153; 700/245

(58) Field of Classification Search
USPC ........... 700/245, 259; 318/800; 382/100, 115, 382/118, 153
See application file for complete search history.

(56) References Cited

U.S. PATENT DOCUMENTS

| | | | |
|---|---|---|---|
| 6,278,904 B1 * | 8/2001 | Ishii | 700/245 |
| 6,381,515 B1 * | 4/2002 | Inoue et al. | 700/245 |
| 6,385,586 B1 * | 5/2002 | Dietz | 704/277 |
| 6,430,306 B2 * | 8/2002 | Slocum et al. | 382/118 |
| 6,459,955 B1 * | 10/2002 | Bartsch et al. | 700/245 |
| 6,512,965 B2 * | 1/2003 | Osawa | 700/245 |
| 6,516,247 B2 * | 2/2003 | Funada | 700/245 |
| 6,539,283 B2 * | 3/2003 | Takagi | 700/245 |
| 6,587,751 B2 * | 7/2003 | Takamura et al. | 700/245 |
| 7,062,073 B1 * | 6/2006 | Tumey et al. | 382/118 |
| 7,103,447 B2 * | 9/2006 | Di Profio et al. | 700/245 |
| 2002/0111988 A1 * | 8/2002 | Sato | 709/202 |
| 2003/0187547 A1 * | 10/2003 | Naka et al. | 700/245 |
| 2003/0236590 A1 * | 12/2003 | Park et al. | 700/245 |
| 2004/0015266 A1 * | 1/2004 | Skoog | 700/245 |
| 2004/0203644 A1 * | 10/2004 | Anders et al. | 455/414.1 |
| 2004/0243280 A1 * | 12/2004 | Bash et al. | 700/245 |

* cited by examiner

*Primary Examiner* — Khoi Tran
*Assistant Examiner* — Stephen Holwerda
(74) *Attorney, Agent, or Firm* — John L. Rogitz

(57) ABSTRACT

A mechanical robot can have a GPS receiver for localization, to enable it to navigate and/or perform location-specific functions. Also, the robot can be caused to ambulate in a location, taking pictures of guests and/or sounding an alarm if an unknown person is imaged by a camera on the robot. Further, the robot can be given a voice message for a recipient, and then ambulate around until, using face or voice recognition, it recognizes the intended recipient and delivers the message, e.g., aurally using a speaker.

4 Claims, 2 Drawing Sheets

ENHANCEMENTS TO MECHANICAL ROBOT

FIELD OF THE INVENTION

The present invention relates generally to mechanical robots.

BACKGROUND

In recent years, there has been increased interest in computerized robots such as, e.g., mechanical pets, which can provide many of the same advantages as their living, breathing counterparts. These mechanical pets are designed to fulfill certain functions, all of which provide entertainment, and also in many cases general utility, to the owner.

As an example, Sony's AIBO robot is designed to mimic many of the functions of a common household pet. AIBO's personality develops by interacting with people and each AIBO grows and develops in different way based on these interactions. AIBO's mood changes with its environment, and its mood affects its behavior. The AIBO can provide certain features and entertainment to the owner through such things as execution of certain tasks and actions based on its programming and the commands of the user. An AIBO can perform any number of functions, e.g., creating noise frequencies that resemble a dog's bark.

In general, a mechanical "robot" as used herein and to which the present invention is directed includes movable mechanical structures such as the AIBO or Sony's QRIO robot that contain a computer processor, which in turn controls electromechanical mechanisms such as wheel drive units and "servos" that are connected to the processor. These mechanisms force the mechanism to perform certain ambulatory actions (such as arm or leg movement).

SUMMARY OF THE INVENTION

A mechanical robot includes a body, a processor mounted on the body, and one or more electromechanical mechanisms controlled by the processor to cause the body to ambulate. A localization beacon receiver is mounted on the body and is electrically connected to the processor to communicate localization data thereto. With this structure, the processor may execute logic that includes receiving the localization data from the beacon receiver, and based on the localization data, establishing at least one function.

The function may be a navigation function, or it may be a language selection function or other function that requires localization knowledge. The receiver can be a GPS receiver or an rf identification receiver.

In some implementations the robot can include a camera mounted on the body and electrically connected to the processor. The logic executed by the processor may further include imaging a person using the camera to render a visual and/or aural image, and processing the image using face and/or voice recognition techniques. Based on the processing act, it can be determined whether the image matches a stored image stored in the robot. If the image does not match a stored image, the image can be stored in the robot, and in some implementations a security alarm can be actuated. Also, a message having a recipient can be received by the robot, and the processor can determine whether the image matches a stored image stored in the robot. If so, the message can be displayed on a display on the robot, and otherwise the robot can be caused to ambulate and repeat the imaging, processing, and determining acts.

In another aspect, a mechanical robot includes a body, a processor mounted on the body and executing logic, and at least one electromechanical mechanism controlled by the processor to cause the body to ambulate. A camera can be mounted on the body and can be electrically connected to the processor. The logic may include imaging a person using the camera to render a visual and/or aural image, and processing the image using face and/or voice recognition techniques.

In still another aspect, a mechanical robot includes a body, a processor mounted on the body and executing logic, and at least one electromechanical mechanism controlled by the processor to cause the body to ambulate. A camera may be mounted on the body and can be electrically connected to the processor. The processor receives a message having a recipient and images a person using the camera to render a visual and/or aural image. The processor then recognition-processes the image to determine whether the image matches a stored image stored in the robot, and if so, the processor displays the message on a display on the robot, and otherwise causes the robot to ambulate and repeat the imaging and recognition-processing acts.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
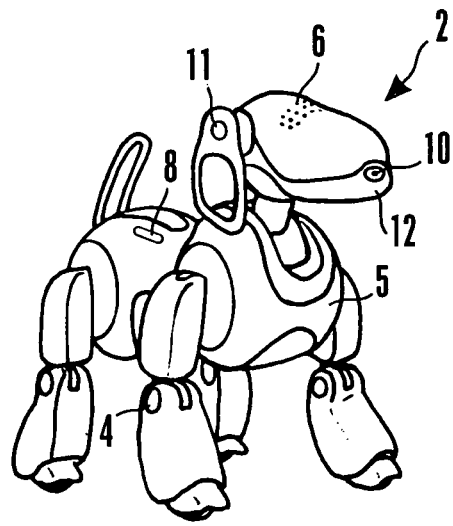
FIG. 1 is a perspective view of a non-limiting robot, schematically showing certain components.

Referring initially to FIG. 1, a mechanical, preferably battery-driven robot 2 is shown that may be embodied in a non-limiting implementation by a Sony AIBO-type or QRIO-type device, with the enhancements herein provided. The robot 2 has multiple servos 4 operating and moving extremities of a robot body 5. These servos are connected to a computer processor 6 that controls the servos using electromagnetic signals in accordance with principles known in the art. Additionally, as set forth further below, the processor 6 may have other functions, including face recognition using face recognition principles known in other contexts, delivery of messages, and the ability to determine its location on the globe.

Accordingly, in some implementations an external beacon receiver 8 such as a global positioning satellite (GPS) receiver is mounted on the robot 2 as shown and is electrically connected to the processor 6. Other beacon receivers such as rf identification beacon receivers can also be used.

Using information from the receiver 8, the processor 6 determines its localization, including the position of the robot 2 in its particular environment (e.g., living room, dining room) and/or its geographic position on the globe itself (e.g., America, Japan). To enable the processor to use a GPS signal to determine a location in a dwelling, the processor 6 can access a map of the dwelling that correlates particular locations in the dwelling to latitude and longitude. The map may be stored in, e.g., solid state or disk memory available to the processor 6.

FIG. 1 also shows that a camera 10 is mounted on the robot 2. The camera 10 is electrically connected to the processor 6.

As set forth further below, the camera 10 can be used as the robot's primary mode of sight. As also set forth below, as the robot 2 "roams" the camera 10 can take pictures of guests in its environment and the processor 6 can determine face recognition based on the images acquired through the camera 10. A microphone 11 may also be provided on the robot 2 and can communicate with the processor 6 for sensing, e.g., voice commands and other sounds.

Additionally, the robot 2 may be provided with the ability to deliver messages from one person/user to another through an electric delivery device, generally designated 12, that is mounted on the robot 2 and that is electrically connected to the processor 6. This device can be, but is not limited to, a small television screen and/or a speaker which would deliver the optical and/or verbal message.

Figure 2:
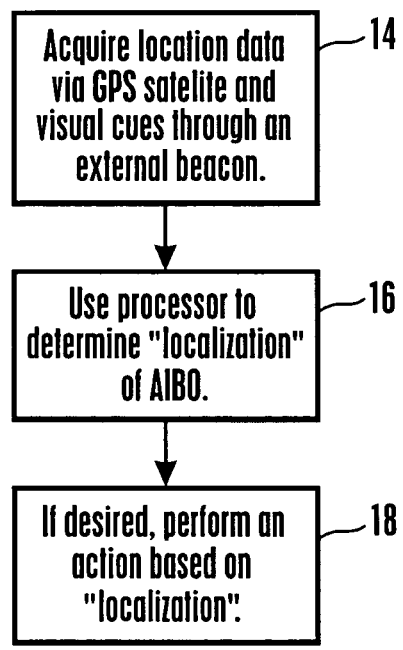
FIG. 2 is a flow chart of the localization logic.

Now referring to FIG. 2, a flow chart is shown outlining the process for determining the position of the robot 2 in its local environment and on the globe. Beginning at block 14, the computer processor 6 acquires data about its location based on the signal from the receiver 8. The logic then flows to block 16, where the processor 6 takes the information and determines the "localization" of the robot 2 relative to its particular environment using the map mentioned above and/or its position on the globe itself. Finally, at block 18 the location data can be used to prompt certain location-dependent actions by the robot 2.

It is to be understood that as intended herein, the nature of the location-dependent actions taken at block 18 are not limiting. By way of example only, location-dependent actions can include prompting the robot to charge itself when the processor 6 determines it is in a room in which a battery charger might be located. Or, when the processor senses a low battery voltage, it can actuate the robot servos to cause the robot to navigate, using position information from the receiver 8, to a charging station the location of which can be stored in the map mentioned above. Knowing position also facilitates movement of the robot 2 from room to room in its environment.

Also, the robot 2 can use the position information to serve as a travel/map guide in a motor vehicle. For instance, using position information and the above-mentioned internal map, along with a desired destination, the processor can issue driving instructions through the speaker 12. Further non-limiting examples of location-dependent actions that can be executed by the processor 6 include selecting, based on geographic location, a particular language from a dictionary of languages that can be stored on internal storage in the robot 2. The robot 2 could communicate via the speaker 12 using the location-appropriate language. The position information can also be used for establishing, based on location in a dwelling, the volume of sound emitted from the robot 2, e.g., loud barks when in the family room and quiet barks when in the bedroom. In any case, it can now be better appreciated that the range of location-dependent actions in block 18 is wide.

Figure 3:
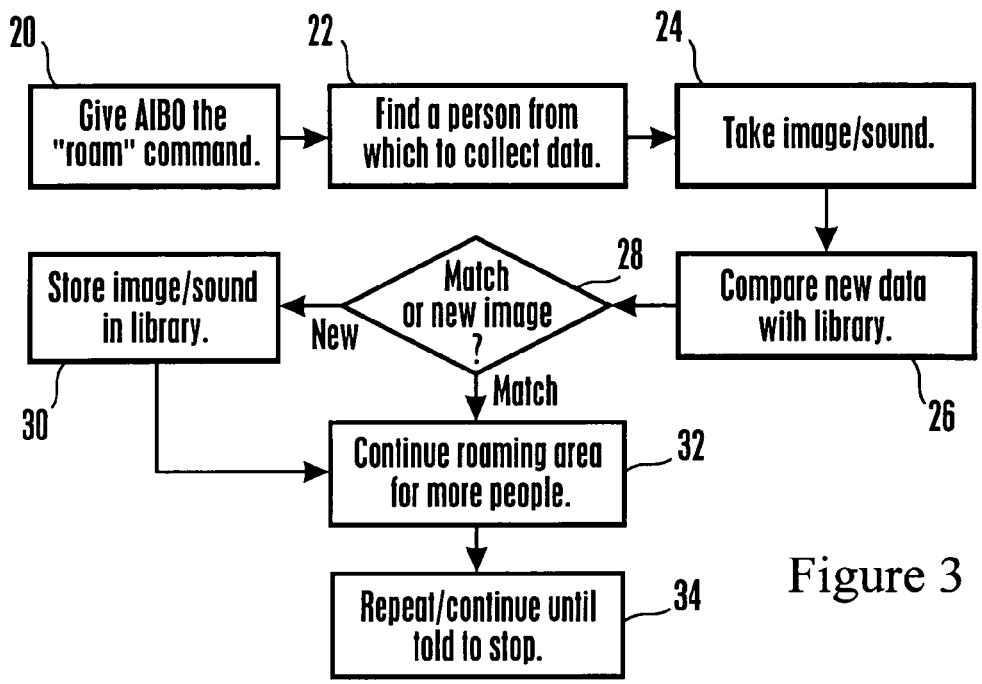
FIG. 3 is a flow chart of the "paparazzi" logic.

Besides location recognition, in some implementations the present robot 2 can also store and process data on individuals based on voice and image recognition, the logic of which is shown in FIG. 3. Essentially, the robot 2 can be used as a "paparazzi", e.g., to automatically collect photos of party guests.

Beginning at block 20, the robot 2 is given a "roam" command by the user by means of, e.g., a spoken command that the processor executes using voice recognition logic. This command prompts the robot 2 to roam around a specified area (i.e. a room or house) and acquire data from individuals it encounters. For instance, at block 22, the robot 2 locates a person from whom to collect data. To do this, at block 24 the robot 2 can acquire image (e.g., digital photographs) or sound data from the subject using, e.g., the camera 10 and/or microphone 11 shown in FIG. 1 to ascertain that a human subject is nearby. This may done any number of ways, including comparing an image outline against an internal data structure (such as a template) representing a human and determining whether the image outline "fits" the template.

In some implementations the logic may then flow to block 26 where the data taken can be compared to individual-specific information that is already resident in a database (also called a "library") of sounds and/or images that are stored on internal memory of the robot 2. This data may be accumulated by remembering sound frequencies and correlating the frequencies to a specific individual's voice, and by remembering the shape and features of a person's face for subsequent face recognition.

Moving to decision diamond 28 in FIG. 3, the processor 6 can determine whether the data collected matches an individual's data already stored in the database. If the new data does not match any of the old individual data, at block 30 the processor 6 stores the new data (e.g., digital photographs) in its memory. From there, block 32 shows that the robot 2 continues roaming the specified area to acquire picture and/or sound recordings for more individuals. However, if the collected data matches that of an individual already recognized by the processor 6, then the logic may flow from diamond 28 directly to block 32, where the robot 2 continues its roam function in search of more individuals from which to collect data. It is to be understood that in images containing multiple persons, an image may be stored if it includes any new combination of previously-imaged individuals, or the image may be discarded if it is recognized to contain even a single previously-stored individual. In any case, the storing of an excessive number of pictures of a single individual can be avoided. Alternatively, the robot 2, on the "roam" command, can simply start to roam and take pictures at predetermined or random time intervals, and store all images it collects. At block 34, the actions are repeated or continued until the robot 2 detects a command ("stop") to cease these actions.

In other implementations such as security applications, a negative test outcome at decision diamond 28 (indicating that a person has been detected who is not in the database library) could cause the processor 6 to actuate the speaker 12 as an alarm, indicating that a stranger is present.

Yet another capability the robot 2 may possess is the ability to deliver messages/emails to individuals, creating a networked environment at a location (i.e. home or office). The unique advantage in this non-limiting aspect of the present invention is the elimination of user-names and passwords for receiving such messages. The processor 6 uses its face and voice database to locate the correct individual for the message, which can expedite the delivery process or at least allow for more user convenience. The process for delivering a message/email is outlined in FIG. 4.

Figure 4:
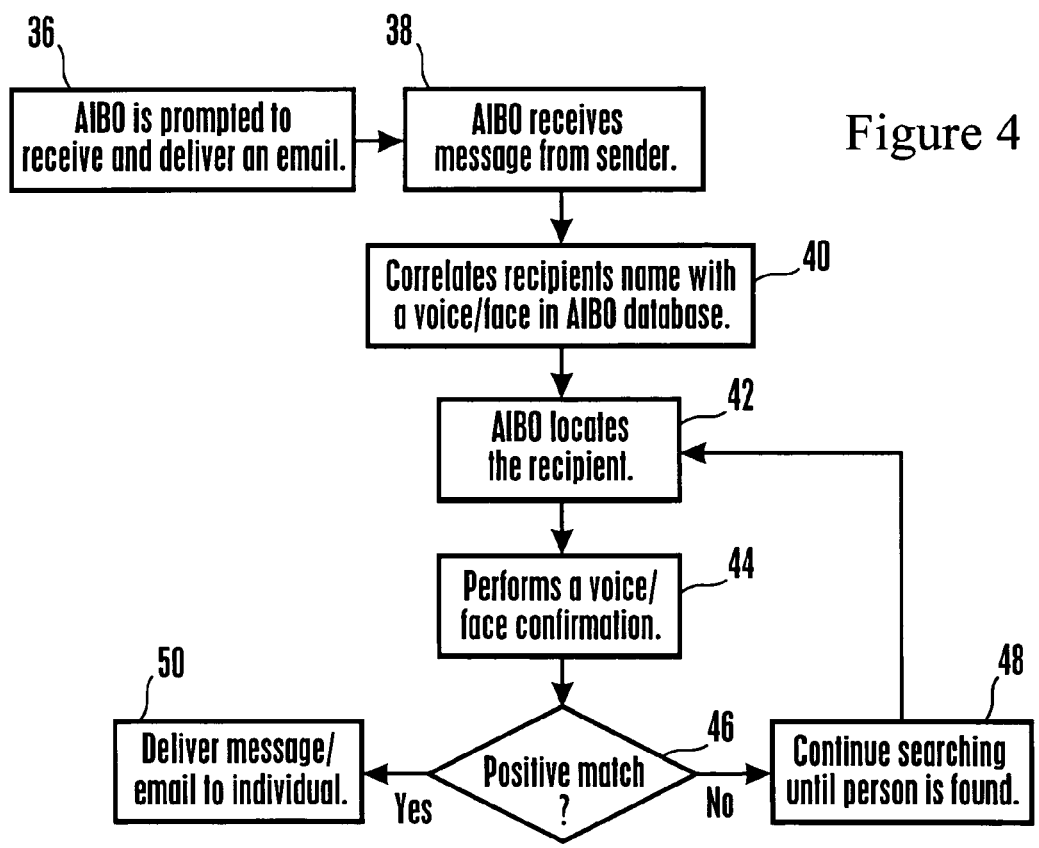
FIG. 4 is a flow chart of the message delivery logic.

Commencing the logic in FIG. 4 at block 36, the processor 6 can be prompted (by, e.g., voice command) to receive message content from a user and deliver it to another user that is specified by the sender of the message. At block 38, the processor 6 receives the message from the sender. Block 40 shows the processor 6 correlating the given name of the recipient with face and/or voice recognition data stored in its database (library). Moving to block 42, the robot 2 can roam about in an attempt to locate a recipient who may receive the message. At block 44 the processor 6 performs a voice and/or face recognition to authenticate the correct recipient of the message. The logic then moves to decision diamond 46, where the processor 6 determines whether a positive match to the recipient has been made. If it has not, the logic proceeds to block 42, where the processor 6 causes the robot 2 to continue moving and searching until the correct recipient is recognized. If the recipient has been correctly identified, the logic moves to block 50 where the robot 2 delivers the message/email either verbally (i.e. through the built-in speaker 11) or displays the message on the display 10, if desired only after the intended recipient has given the correct code or password in response to, e.g., a verbal challenge transmitted from the speaker 12.

While the particular ENHANCEMENTS TO MECHANICAL ROBOT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A mechanical robot, comprising:
    a body;
    at least one processor mounted on the body and executing logic;
    at least one electro-mechanical mechanism controlled by the at least one processor to cause the body to ambulate;
    at least one data storage supported by the body and accessible to the at least one processor; and
    at least one camera mounted on the body and electrically connected to the at least one processor, and the logic comprises:
        imaging at least one person using the camera to render a visual and/or aural image,
        determining whether the image matches data already stored in the data storage, and if the image does not match data in the storage, storing the image in the data storage, and otherwise not storing the image in the data storage, wherein the image is determined not to match data in the storage at least in response to the image being determined to include a new combination of previously-imaged individuals.

2. The robot of claim 1, wherein if the image does not match a stored image, actuating a security alarm.

3. The robot of claim 1, wherein the logic further comprises:
    receiving a message having a recipient;
    determining whether the visual and/or aural image correlates to an authorized recipient, and if so, displaying the message on at least one display on the robot, and otherwise causing the robot to ambulate and repeat the imaging, processing, and determining acts.

4. The robot of claim 1, comprising at least one localization beacon receiver mounted on the body and electrically connected to the at least one processor to communicate localization data thereto, the logic further comprising:
    receiving the localization data from the at least one beacon receiver; and
    based on the localization data, establishing at least one function.

* * * * *